United States Patent
Butterworth et al.

(10) Patent No.: US 7,716,518 B2
(45) Date of Patent: *May 11, 2010

(54) REMOTE COPY SYNCHRONIZATION IN DISASTER RECOVERY COMPUTER SYSTEMS

(75) Inventors: Henry E. Butterworth, Eastleigh (GB); Carlos F. Fuente, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/192,564

(22) Filed: Aug. 15, 2008

(65) Prior Publication Data
US 2008/0301494 A1    Dec. 4, 2008

Related U.S. Application Data

(63) Continuation of application No. 11/139,797, filed on May 27, 2005, now Pat. No. 7,451,345.

(51) Int. Cl.
*G06F 11/00* (2006.01)
(52) U.S. Cl. .............................. 714/4; 714/6
(58) Field of Classification Search ...... 714/4, 714/6
See application file for complete search history.

(56) References Cited

U.S. PATENT DOCUMENTS

| | | | |
|---|---|---|---|
| 6,167,531 A * | 12/2000 | Sliwinski | 714/13 |
| 6,308,284 B1 * | 10/2001 | LeCrone et al. | 714/6 |
| 6,480,970 B1 * | 11/2002 | DeKoning et al. | 714/6 |
| 6,578,120 B1 * | 6/2003 | Crockett et al. | 711/162 |
| 6,701,455 B1 * | 3/2004 | Yamamoto et al. | 714/18 |
| 7,111,189 B1 * | 9/2006 | Sicola et al. | 714/6 |
| 7,139,851 B2 * | 11/2006 | Fujibayashi | 710/58 |
| 7,149,919 B2 * | 12/2006 | Cochran et al. | 714/4 |

FOREIGN PATENT DOCUMENTS

| | | |
|---|---|---|
| JP | 04-013367 | 1/1992 |
| JP | 11-242566 | 9/1999 |
| WO | 01/97030 | 12/2001 |

* cited by examiner

*Primary Examiner*—Marc Duncan
(74) *Attorney, Agent, or Firm*—Dillon & Yudell LLP

(57) ABSTRACT

A method, storage system, and machine-readable medium for resynchronizing data stored among a first storage element and a second storage element of a remote copy pair of storage elements is disclosed. According to one embodiment, a method is provided which includes detecting a reestablishment of a remote copy relationship between the first and second storage elements and performing a resynchronization operation in response to this detection. Performing the resynchronization operation comprises transmitting data of a second change record associated with the second storage element to the first storage element, combining the second change record with a first change record associated with the first storage element, identifying a data segment of the second storage element utilizing the combined change record, and overwriting data of the first storage element with data of the identified data segment.

6 Claims, 3 Drawing Sheets

REMOTE COPY SYNCHRONIZATION IN DISASTER RECOVERY COMPUTER SYSTEMS

PRIORITY CLAIM

The present application is a continuation of U.S. patent application Ser. No. 11/139,797, filed on May 27, 2005, now U.S. Pat. No. 7,451,345 and entitled, "Remote Copy Synchronization in Disaster Recovery Computer Systems," which is incorporated herein by reference.

CROSS-REFERENCE TO RELATED APPLICATIONS

The present application hereby claims benefit of priority under 35 U.S.C. §120 and §365 to the previously filed international patent application number PCT/GB2003/003537 entitled, "Improved Remote Copy Synchronization in Disaster Recovery Computer Systems," filed on Aug. 13, 2003, naming Henry Esmond Butterworth and Carlos Francisco Fuente as inventors, assigned to the assignee of the present application, and having a priority date of Nov. 29, 2002, based upon United Kingdom Patent Application No. 0227786.1 which are both herein incorporated by reference in their entirety and for all purposes.

BACKGROUND

1. Technical Field

The present invention relates to the field of disaster recovery computer systems, and more particularly to the resynchronization of primary and secondary copies of data after a disconnection and reestablishment of the Remote Copy pair.

2. Description of the Related Art

In the field of computer data processing there is increasing demand for ways for organizations to continue doing business even after the loss of use of data or processing capability at the main business data processing site. The technique used in typical disaster recovery solutions is known in the art as "Remote Copy", or sometimes "Peer-to-Peer Remote Copy (PPRC)".

In a typical Remote Copy solution, one storage controller is designated as holding the primary disk of a remote copy relationship. The primary disk of the relationship will be referred to herein as the Master. The Master is the disk normally used by a person or organization for day-to-day processing. A second storage controller holds the secondary disk of the remote copy relationship, which will be known as the Auxiliary. The Auxiliary is the disk normally not used by a person or organization for day-to-day processing, but held in reserve in case of a need for disaster recovery or business continuity operations after the loss of use of the Master. Both Master and Auxiliary are the same size. Many solutions allow multiple sets of disks to be managed in a coordinated fashion, and often a controller might hold Masters for one relationship, and Auxiliaries for others, but for clarity and conciseness the present description will focus on a single relationship comprising two disks. In normal operation, the Master is used as the primary source and target of all host I/O requests. In these circumstances, the term Master/primary will be used in this description. Similarly, in normal operation, the Auxiliary is not used as the source or target of host I/O requests, but is used to hold a copy of the data from the Master/primary and to accept changes passed on to it from the Master/primary as a result of writes directed to the Master/primary. In these circumstances, the term Auxiliary/secondary will be used in this description. The Master/primary is thus the disk that normally, in the absence of a disaster, holds the application data. The function of Remote Copy is to maintain a copy of that data on the Auxiliary/secondary disk.

To establish initial synchronization, all the data is copied from Master/primary to Auxiliary/secondary. Once synchronization has been established, each write I/O received at the Master/primary is sent to the Auxiliary/secondary disk as well as to the Master/primary. Under normal situations, the Auxiliary/secondary does not receive writes from applications directly, but only indirectly from writes issued at the primary and forwarded to it.

In the event of a loss of connection between the two sites, a conventional technique that is well known is to use change recording at the Master/primary. This typically uses a bitmap to record which regions of the disk at the Master/primary have received write I/O. It is common to map a single bit to 32 k of data, or some similar fairly small amount. Once the link is reestablished, the bitmap is used to resynchronize the Auxiliary/secondary, bringing it fully up to date with the Master/primary, by transferring data corresponding to every bit marked as changed in the bitmap.

However, there are uses of Remote Copy where this well-known scheme by itself is insufficient. One example is what is done after a disaster. Typically, if a disaster occurs at the Master/primary controller, then access to the Auxiliary/secondary controller is enabled, and the application is restarted using the storage there. This situation will be referred to in this description by using the term Auxiliary/primary.

However, the next thing that is needed is to reestablish a disaster recovery capability. In many 'disasters', the Master site is in fact physically intact, possibly only having suffered a power failure or a similar short-term failure. It is thus possible to use the Master (old primary) as the secondary of the relationship (thus creating a Master/secondary), and to have the Auxiliary become the primary (as an Auxiliary/primary, as defined above), essentially reversing the flow of data. While this is possible with today's products, they require that a full copy be performed from Auxiliary/primary to Master/secondary, repeating the problem faced by the user in the initial setup.

While this cost may at first appear to be acceptable because a real disaster is an infrequent occurrence, it must be borne in mind that testing the disaster recovery system is an essential part of any disaster recovery plan. Some companies and other organizations are required to demonstrate their disaster recovery capability in order to pass an audit, possibly as frequently as once a month. If the disaster recovery test involves carrying out a complete failing-over of the business as described above, the cost of a full copy from Auxiliary/primary to Master/secondary to reestablish synchronization is very heavy.

All known conventional schemes require a full copy after such a failover scenario, unless great care was taken to ensure that the application was completely halted at the old primary with no outstanding, "in-flight" updates, before switching the primary/secondary roles. This, however, is untypical of the way in which complex systems fail. Frequently, failures are of the type known as "rolling failures", where parts of the original Master/primary system fail over a period of time before the failover is triggered. In these circumstances, there may be changes made at the old Master/primary during the rolling failure of which the original Auxiliary/secondary has not been made aware.

It might be thought that the solution to the problem would be to set up the remote copy in reverse, and simply use change recording on the Auxiliary/primary to define what must be copied back to the Master/secondary after a disaster has been recovered. This is inadequate, because, as described above, changes might have happened at the original Master/primary during the failure, which were not change-recorded at the original Auxiliary/secondary. If these are not corrected, then the Master and the Auxiliary may never become truly synchronized.

A different scenario, but again one which might occur in the context of a disaster recovery or other form of test (such as an upgrade test), is where the Auxiliary/secondary is broken away from the Master/primary, and then directly receives write I/Os in its isolated state, perhaps from a test application, while the business continues to run as normal at the Master. Here, the resynchronization after reestablishment of the connection must be from Master to Auxiliary, even though the Auxiliary has been temporarily treated as an Auxiliary/primary while the Master was simultaneously being treated as a Master/primary. It is essential in this case that the real application data at the Master not be overwritten by the test data that has been applied at the Auxiliary during the period of its isolation from the Master.

It is therefore desirable to have an efficient means of Remote Copy resynchronization while alleviating the disadvantages of applying costly full copies of data as in the conventional systems described above.

BRIEF SUMMARY

The present invention accordingly provides a method, storage system, and machine-readable medium for resynchronizing data stored among a first storage element and a second storage element of a remote copy pair of storage elements, wherein the first storage element is initially designated a primary storage element of the remote copy pair and the second storage element is initially designated a secondary storage element of the remote copy pair. According to one embodiment, a method is provide which includes detecting a reestablishment of a remote copy relationship between the first storage element and the second storage element and performing a resynchronization operation in response to detecting the reestablishment. In the described embodiment, performing the resynchronization operation comprises causing data of a second change record associated with the second storage element to be transmitted from the second storage element to the first storage element, combining the data of the second change record with data of a first change record associated with the first storage element within a merged change record, identifying a data segment of the second storage element utilizing the merged change record, and overwriting data of the first storage element with data of the data segment in response to identifying the data segment.

According to another embodiment, a storage system is provided which includes a remote copy pair of storage elements comprising a first storage element and a second storage element, wherein the first storage element is initially designated a primary storage element of the remote copy pair and the second storage element is initially designated a secondary storage element of the remote copy pair, and a processor coupled to the remote copy pair of storage elements and configured to perform the method previously described-herein.

According to yet another embodiment, a machine-readable medium is provided having a plurality of instructions executable by a machine embodied therein, wherein the plurality of instructions, when executed, cause said machine to perform the method previously-described herein.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, software, firmware, or a combination thereof and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A preferred embodiment of the present invention will now be described by way of example only, with reference to the accompanying drawings, in which.

DETAILED DESCRIPTION OF AN ILLUSTRATIVE EMBODIMENT

Figure 1:
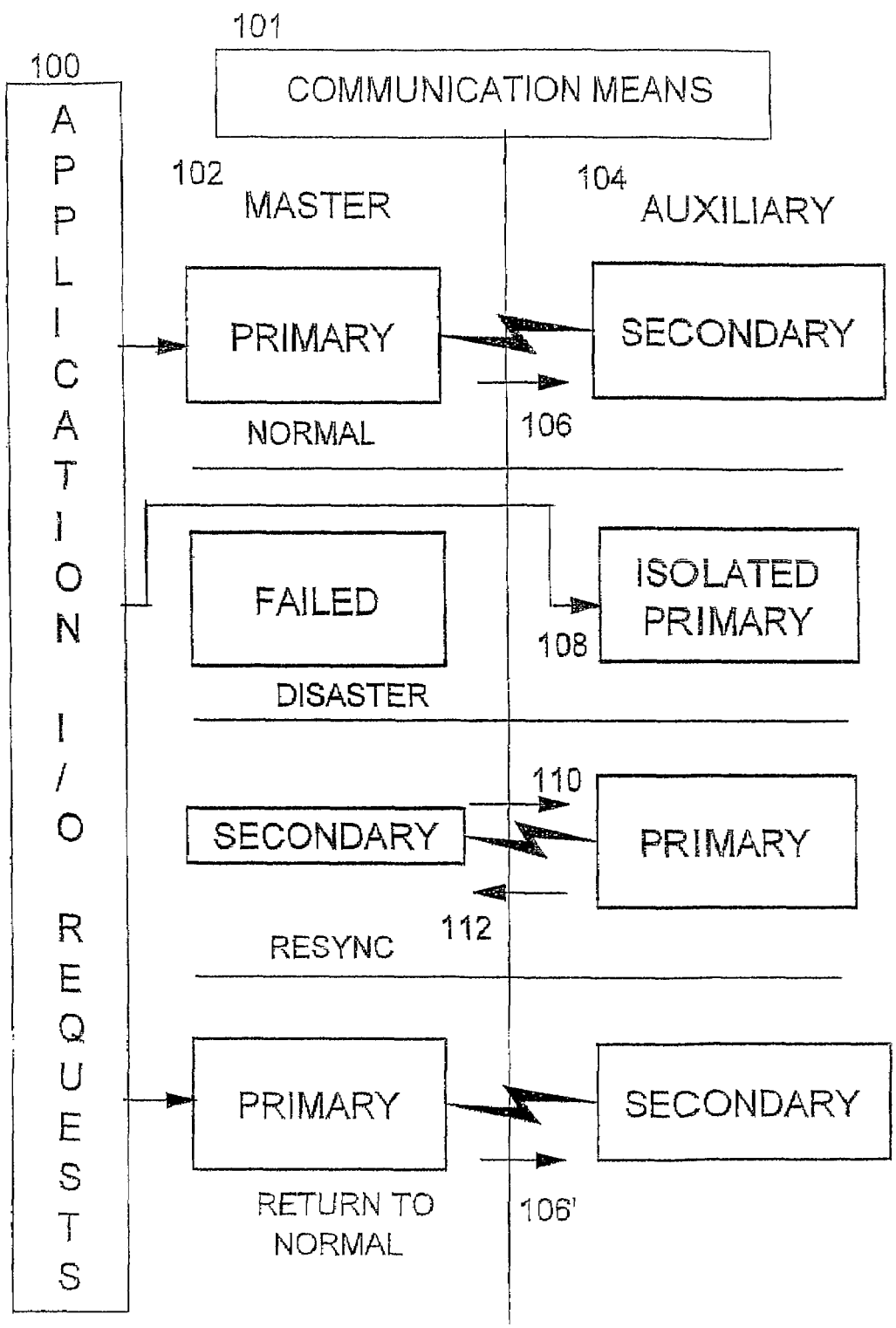
FIG. 1 is a block diagram illustrating an arrangement of apparatus in accordance with an embodiment of the present invention.

An arrangement of apparatus according to a preferred embodiment of the present invention is shown in FIG. 1. The arrangement is responsive to application I/O requests 100 to operate communication means 101 between a Master disk 102 and an Auxiliary disk 104. The normal communications flow responsive to application I/O requests 100 is shown by arrow 106 where the Master 102 is the primary disk in the relationship and the Auxiliary 104 is the secondary. On the occurrence of a disaster, the Master is failed and application I/O requests 100 follow the path represented by arrow 108 directly to the Auxiliary 104 which operates as an isolated primary disk.

Resynchronization after the reestablishment of the Remote Copy relationship takes place when the change bitmap recording changes made at the secondary disk is sent to the primary disk, as represented by arrow 110. It will be clear to one of ordinary skill in the art that at resynchronization, it is a user decision as to which disk shall be designated the primary disk and which the secondary. In the example shown here, the Master has been designated as the secondary disk, and the Auxiliary has been designated as the primary disk, but the relationship could equally be established in reverse.

When the bitmap representing changes made at the Master/secondary 102 has been received by the Auxiliary/primary 104 and merged with the bitmap representing changes made at the Auxiliary/primary, all the changes from the resulting merged bitmap are copied from the Auxiliary/primary 104 to the Master/secondary 102, as shown at arrow 112. At some later stage, the roles of the Master 102 and the Auxiliary 104 may be reversed to return to normal operation, where the Master/primary 102 communicates with the Auxiliary/secondary 104 using communication means 101 to pass remote copy activity along the path represented by arrow 106'. This reversal of roles to revert to normal is not a requirement of the preferred embodiment of the present invention, but is to be expected in the normal course of user activity, as the Master/primary is likely to have been selected on some logical basis, such as locality or available day-to-day processing power.

Figure 2A:
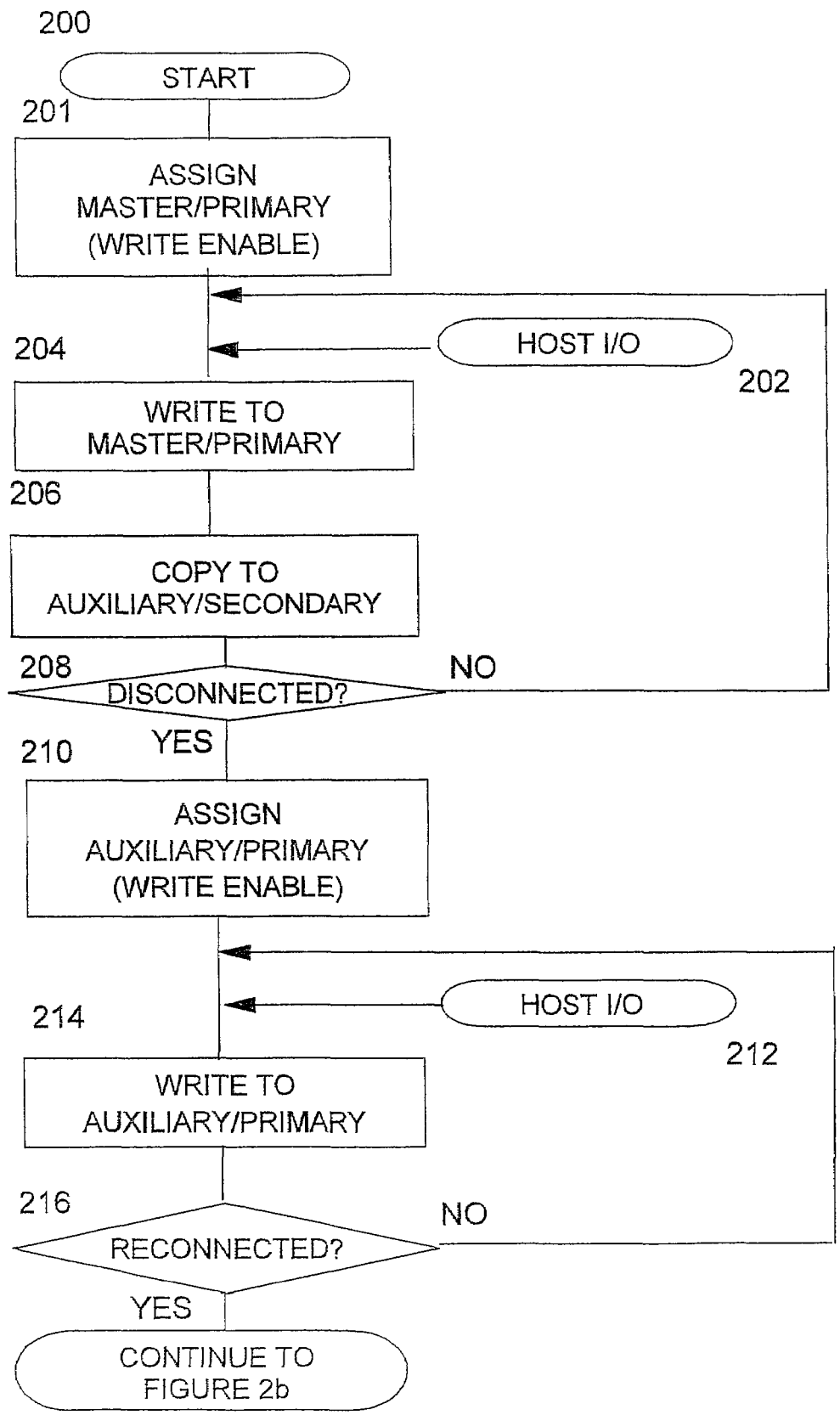
FIGS. 2a and 2b show a flow diagram illustrating steps of a method in accordance with an embodiment of the present invention.
Figure 2B:
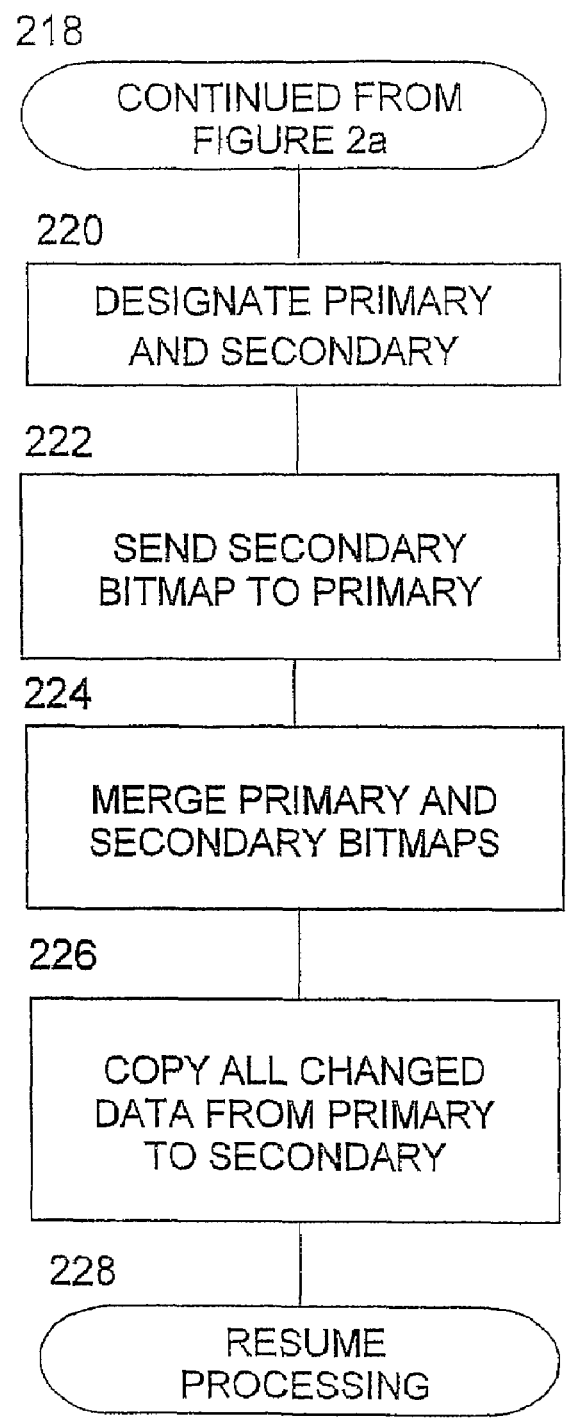

Turning now to FIGS. 2a and 2b, there is shown a flow diagram representing steps of a method, which may be embodied using hardware, software or a combination thereof, according to a preferred embodiment of the present invention.

At step 200, the system is initialized, with, at step 201, the assignment of a Master/primary disk (effected in the preferred embodiment by write enabling the Master disk). Responsive to the receipt of Host I/O 202 the I/O activity (here exemplified as a write request) causes a write 204 to the Master/primary, followed by a copy step 206 to the Auxiliary/secondary. This process continues until a loss of connection is registered at test step 208.

In response to the loss of connection, the Auxiliary is designated as a primary disk (in the preferred embodiment, by write enabling the Auxiliary). On receipt of Host I/O 212, for example a write request, data is written directly to the Auxiliary/primary at step 214. This process continues until reestablishment of the Master/Auxiliary relationship is registered at test step 216. At step 220, a primary and secondary are designated. As described above, this designation may assign the Master or the Auxiliary as the primary, and its counterpart as the secondary. Prior to resynchronization, at step 222, the change recording bitmap from the secondary is sent to the primary and merged 224 with the change recording bitmap from the primary. At step 226, all data that was marked as changed in the merged bitmap is copied from the primary to the secondary. The resynchronization is complete when all changed data has been copied, and at step 228 processing is resumed.

Thus, in the preferred embodiment whenever a disk is enabled for write access, it is placed in a mode where change recording is enabled (in the most preferred embodiment, this is synonymous with being accorded the primary role). Whenever, a disk is inhibited from accepting writes (becomes a secondary), the change recording maps from both disks are merged and established as the new change recording bitmap. This is most preferably done before any resynchronization takes place, although the resynchronization may be begun in parallel in an alternative embodiment. For example, while the change recording map from the secondary is being sent to the primary, the process of applying a first set of changes that have been recorded at the primary may be started.

The term "merge" is used here to mean that, for each region of the disk encoded in the map, if either map indicates the region has changed, then the new map is set to indicate it has changed. This can conveniently be achieved, if the maps are bitmaps, by using a logical OR operation.

The merge requires that the change recording map be transferred from the secondary controller to the primary controller. In the preferred embodiment, this occurs over the same Fiber Channel connection as is used for data traffic, using a control connection that is established there. In one alternative, the map could be read into a host system, and then the merge could be driven to the primary controller from there, using, for example, a TCP/IP network for both transfers.

The resynchronization process is that for each region marked as changed in the merged map, data is copied from primary to secondary. Thus, invalid or unwanted changes at the secondary are overwritten with valid data from the primary, and valid changes to data from the primary are applied to the secondary.

It will be appreciated that the method described above will typically be carried out in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be appreciated that various modifications to the embodiment described above will be apparent to a person of ordinary skill in the art.

What is claimed is:

1. A machine-readable medium having computer program product for performing disaster recovery, said computer machine-readable medium comprising:

computer program code for establishing a remote copy pair relationship between a first storage element and a second storage element by designating said first storage element as a primary disk and said second storage element as a secondary disk, wherein said first storage element handles write requests from a host, and data from said write requests are subsequently copied to said second storage element;

computer program code for, in response to a loss of connection from said host to said first storage element, designating said secondary storage disk as said primary disk, wherein said second storage element handles write requests from said host;

computer program code for, in response to a reestablishment of said remote copy pair relationship between said first storage element and said second storage element, designating said first storage element as said primary disk and said second storage element as said secondary disk;

merging a recording bitmap of said second storage element with a recording bitmap of said first storage element; and copying data that are marked as changed in said merged recording bitmap from said second storage element to said first storage element.

2. The machine-readable medium of claim 1, said machine-readable medium further comprising:

computer program code for detecting a separation of said remote copy pair relationship between said first storage element and said second storage element;

computer program code for identifying changed data segments within said first storage element in response to said separation detection utilizing said recording bitmap of said first storage element;

computer program code for detecting a disaster occurring at said first storage element; and computer program code for identifying changed data segments within said second storage element in response to said disaster detection utilizing said recording bitmap of said second storage element.

3. The machine-readable medium of claim 2, wherein said machine-readable medium further includes computer program code for detecting said reestablishment of said remote copy pair relationship between said first storage element and said second storage element after said disaster.

4. The machine-readable medium of claim 2, wherein said first storage element is designated as said secondary disk of said remote copy pair relationship and said second storage element is designated as said primary disk of said remote copy pair relationship after said disaster.

5. The machine-readable medium of claim 2, wherein said disaster detection further includes computer program code for detecting a failover from said first storage element to said second storage element caused by said disaster.

6. The machine-readable medium of claim 1, wherein said computer program code for merging further includes computer program code for performing a logical OR operation on said two recording bitmaps.

* * * * *